United States Patent [19]

Warhol

[11] Patent Number: 4,626,459
[45] Date of Patent: Dec. 2, 1986

[54] MOUNTING STRUCTURE FOR SECURITY STRIP

[75] Inventor: Nicholas Warhol, Minneapolis, Minn.

[73] Assignee: Minnesota Mining and Manufacturing Company, St. Paul, Minn.

[21] Appl. No.: 773,996

[22] Filed: Sep. 9, 1986

[51] Int. Cl.⁴ .................. B32B 15/12; B32B 3/02
[52] U.S. Cl. .................... 428/40; 283/72; 283/902; 428/191; 428/343; 428/464; 428/916
[58] Field of Search ........... 428/191, 192, 343, 40, 428/916, 464; 427/7; 355/3 SH, 133; 283/72, 83, 94, 902

[56] References Cited

U.S. PATENT DOCUMENTS

| | | | |
|---|---|---|---|
| 4,303,307 | 12/1981 | Tureck et al. | 283/902 |
| 4,352,706 | 10/1982 | Miller | 283/902 |
| 4,420,515 | 12/1983 | Amon et al. | 427/7 |
| 4,486,090 | 12/1984 | Warhol | 355/3 R |

FOREIGN PATENT DOCUMENTS

| | | | |
|---|---|---|---|
| 38878 | 11/1981 | European Pat. Off. | 428/40 |
| 1574614 | 9/1980 | United Kingdom | 283/902 |

*Primary Examiner*—Paul J. Thibodeau
*Attorney, Agent, or Firm*—Donald M. Sell; James A. Smith; Robert L. Marben

[57] ABSTRACT

A mounting structure for a flat, narrow, metallic strip for mounting the strip on a sheet of paper which includes a piece of paper to which the metallic strip is adhered by an adhesive carried on one surface of the adhesive. The piece of paper is dimensioned to provide a border with adhesive that extends about the periphery of the metallic strip. The structure can be stored on Kraft paper to which adhesive does not permanently adhere.

3 Claims, 3 Drawing Figures

MOUNTING STRUCTURE FOR SECURITY STRIP

TECHNICAL FIELD

The invention presented herein relates to electronically detectable, flat, narrow, metallic strips and, in particular, to structures for permanently mounting such a strip on a sheet of paper without preventing use of the sheet of paper as copy paper in an office copier.

BACKGROUND ART

U.S. Pat. No. 4,486,090 to Nicholas Warhol discloses a copy machine having an eddy current proximity detector that is positioned so that a document to be copied is scanned by the detector. If the document to be copied carries a piece of metal, such as a flat, narrow, metallic strip, the strip is detected by the detector which in turn signals the copy machine to prevent it from producing a copy of the document. Documents using such metallic strips sometimes are produced initially using an office copier or duplicator. It is preferred that the sheets of copy paper used to produce such documents have the metallic strip attached to each copy sheet prior to use of the copy paper for receiving the copy image in a copying process. This presents a problem since the metallic strips, which are cut from flat stock, have rough edges which interfere with the feeding of such strip bearing copy sheets into a copy machine. Attachment of the metallic strip to paper, therefore, presents a problem if it is to be used as copy paper for a copy machine.

SUMMARY OF THE INVENTION

The problem presented in attaching a metallic strip to a sheet of paper in a manner that allows the paper to be used as copy paper in a copy machine is solved by the present invention. The present invention also provides a mounting structure for the metallic strip that avoids exposure to a person's hand of the sharp edge of the metallic strip in the event attachment of the metallic strip to a sheet of paper is done manually. The mounting structure provided by the present invention also allows the mounting structures to be stored in roll form which is convenient for use in machinery capable of automatically applying the metallic strip mounting structure to a sheet of paper.

The mounting structure provided by the invention for securing a flat, narrow, metallic strip to a sheet of paper includes the metallic strip that is secured to an adhesive present at one surface of a piece of paper whose length and width dimensions are greater than those of the metallic strip wherein the metallic strip is positioned centrally of such paper so the paper provides an adhesive covered border portion about the periphery of the metallic strip for securing the metallic strip and paper combination to a sheet of paper. The piece of paper bearing the adhesive to which the metallic strip is secured covers the metallic strip when it is secured to a sheet of paper eliminating the problem presented by the metallic strip with respect to movement of the sheet of paper through a copy machine should it be so used.

BRIEF DESCRIPTION OF THE DRAWINGS

The present invention and its embodiment will now be explained in greater detail with reference to the attached drawings wherein.

DETAILED DESCRIPTION

Figure 1:
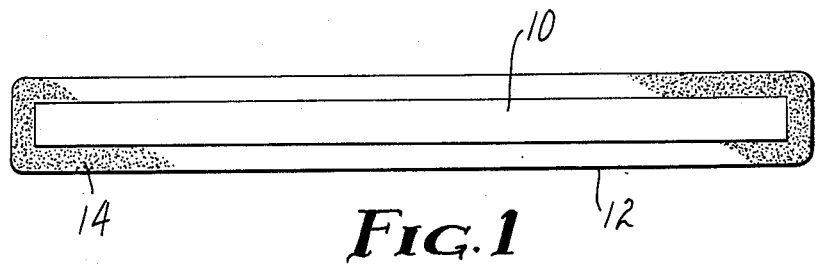
FIG. 1 is a bottom plan view of a metallic strip mounting structure.

Referring to FIG. 1 of the drawings, a mounting structure embodying the invention is shown which includes a flat, narrow, metallic strip 10 that is located centrally of a piece of paper 12. The length and width of the paper 12 exceeds that of the metallic strip to provide a border area around the periphery of the metallic strip by the paper 12. An adhesive 14 is carried on the entire surface of the paper 12 that receives the metallic strip 10. The adhesive can be of the type typically used on paper labels that are stored on a paper liner or carrier, such as 43 pound, semi-bleached Kraft paper, to which the adhesive does not adhere. This allows the mounting structure to be removed readily from such paper for placement on a selected surface. It is preferred that the adhesive also be one that will provide a tenacious bond to paper that is suitable for use in an office copier. Adhesives providing these characteristics are well known.

The mounting structure of FIG. 1 is usable for mounting the metallic strip 10 to paper to be used as copy paper for making copies of documents that are not to be copied or may be secured to an existing document that is not to be copied by use of an office copy machine. The structure of FIG. 1 is secured to any sheet of paper that is to receive a metallic strip 10 by placing the adhesive 14 side of the structure toward the sheet of paper and applying a slight pressure over the entire surface of the structure. The paper 12 used for the structure of FIG. 1 can be one that readily fractures or delaminates so any effort made to remove the metallic strip 10 after it is mounted on a sheet of paper can be readily detected.

Figure 2:
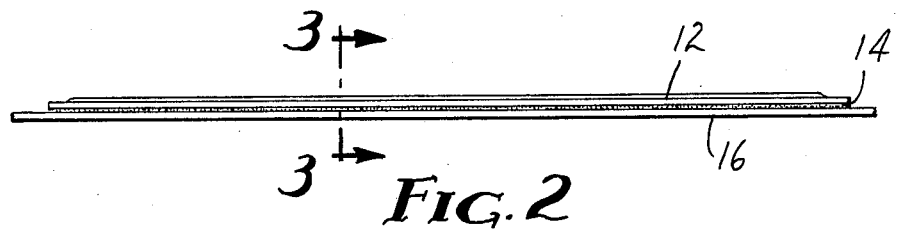
FIG. 2 is a top plan view of the mounting structure of FIG. 1 attached to a liner strip or carrier.
Figure 3:
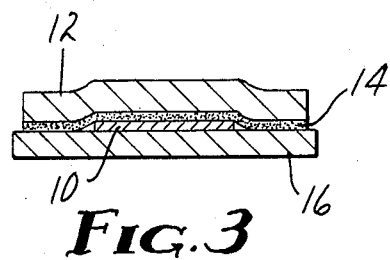
FIG. 3 is an enlarged cross-sectional view taken along the line 3—3 in FIG. 2.

Referring to FIG. 2, a side view of the structure of FIG. 1 is shown wherein it is mounted on a carrier 16 which can be a long, narrow piece of paper to which the adhesive 14 on the paper 12 does not permanently adhere. Forty-three pound, semi-bleached Kraft paper is suitable for the carrier 16. A number of the structures per FIG. 1 can be placed along the carrier 16 which, if desired, can be attached at one end to a mandrel and rolled up to provide a convenient form for storing a number of the FIG. 1 structures. Such an arrangement provides a convenient form for use with machinery for automatically and permanently mounting the structures of FIG. 1 on selected sheets of paper. FIG. 3 is an enlarged sectional view taken along the line 3—3 of the structure of FIG. 2 showing the structure of FIG. 1 carried by the carrier 16. As can be seen, the paper 12 protects a copy machine from the rough edge presented by the metallic strip 10 which allows copy paper to which the structure of FIG. 1 may be attached to pass unimpeded along the copy paper path of a copy machine.

The metal used for the metallic strip 10 can be one which will produce eddy currents when it is placed in a high frequency electromagnetic field allowing it to be detected by an eddy current detector. If such is the case, the metallic strip 10, when mounted on a document that is not to be copied, can be detected by an eddy current detector provided on an office copier of the type described in U.S. Pat. No. 4,486,000 supra preventing the copier from making a copy of a document carrying the metallic strip 10.

An example of a mounting structure per FIG. 1 that can be made includes the use of a white paper 12 having a nominal thickness of 0.0865 mm, a metallic strip 10 of alloy 2826MB, purchased from the Allied Corporation, Morristown, N.J. 07960, having a nominal thickness of about 0.0254 mm with the adhesive 14 carried by the paper 12 being a high strength transparent acrylic adhesive with a nominal thickness of about 0.0279 mm. A liner or carrier 16 on which the structure of FIG. 1 can be stored prior to use can be made from 43 pound, semi-bleached Kraft paper having a nominal thickness of 0.0635 mm.

I claim:

1. A mounting structure for use in mounting a flat, narrow, metallic strip on a sheet of paper including:

a flat, narrow, metallic strip;

a piece of paper having length and width dimensions that are greater than those of said metallic strip; and an adhesive carried on one side of said piece of paper with said narrow, metallic strip held by said adhesive and positioned centrally of said piece of paper whereby an adhesive covered border is provided by said piece of paper about the periphery of said metallic strip for use in securing said piece of paper with said metallic strip to a selected surface.

2. A mounting structure according to claim 1 wherein said adhesive is one that provides a tenacious bond between said piece of paper and copy paper usable in office copiers.

3. A mounting structure according to claim 1 including a carrier having a surface to which said adhesive does not permanently adhere on which said piece of paper with said metallic strip with said adhesive covered border contacting said surface is placed prior to use.

* * * * *